March 17, 1970  E. KAROBATH  3,501,351
GALVANIC PRIMARY CELL

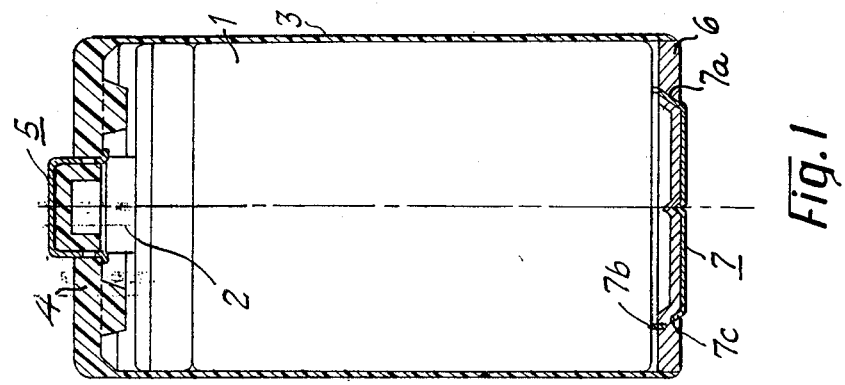
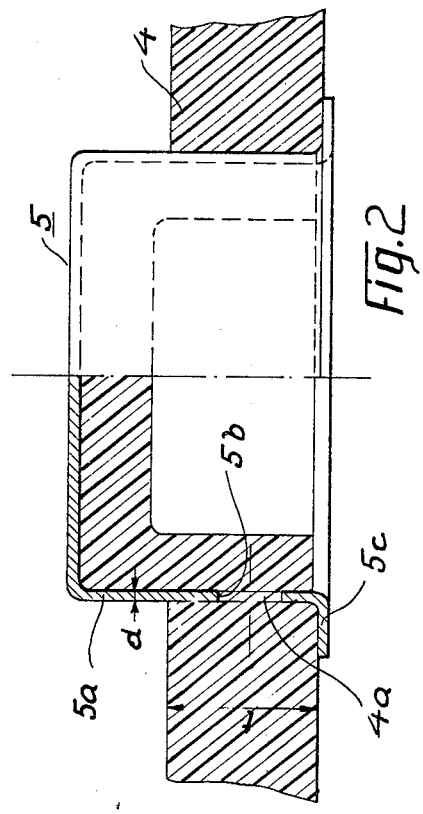
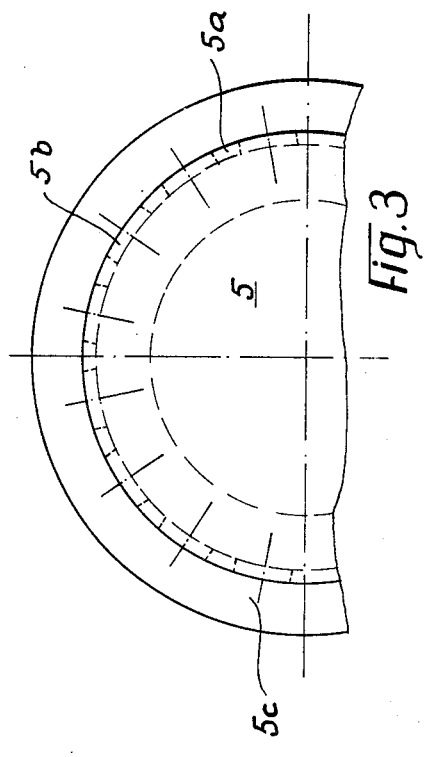

Filed May 26, 1967  2 Sheets-Sheet 2

INVENTOR:
Ernst Karobath,

BY
His ATTORNEY.

United States Patent Office 3,501,351
Patented Mar. 17, 1970

3,501,351
GALVANIC PRIMARY CELL
Ernst Karobath, Vienna, Austria, assignor to Telephon-
und Telegraphen-Fabriks-Aktiengesellschaft Kapsch &
Sohne, Vienna, Austria, a corporation of Austria
Filed May 26, 1967, Ser. No. 641,572
Claims priority, application Austria, May 27, 1966,
A 5,082/66
Int. Cl. H01m 1/02, 5/00
U.S. Cl. 136—133                      5 Claims

ABSTRACT OF THE DISCLOSURE

A galvanic primary cell having positive and negative electrodes is sealed by a tightly surrounding plastic envelope. Apertured sheet metal contacts for the electrodes extend through, and are embedded in, the envelope and the plastic penetrates in rivet-like manner through the apertures.

---

The invention relates to the field of electricity, and relates more particularly to galvanic primary cells or elements. Still more particularly, the invention relates to galvanic primary elements or cells of the type that are sealed against leaking.

Galvanic primary elements or cells (for instance Leclanche elements) customarily are so constructed that the negative electrode is cup-shaped (zinc cup) and forms the container for that cell. The cup surrounds the positive electrode (which customarily is a carbon rod type electrode) with the depolarizer mass as well as the electrolyte. The electric energy is generated by decomposition of the negative cup-shaped electrode. At the same time, during the discharge there is formed water, which leads to a liquation of the electrolyte, the electrolyte in the unused state of the galvanic cell being hardened by a substance that swells. As a result of the aforesaid decomposition during the electric discharge, there may occur a leakage of the electrolyte liquid through the wall of the cup which is gradually destroyed during the discharge; such a leakage of the electrolyte liquid, in turn, leads often to major damages of the apparatus in which the primary element is used.

Various constructions of primary cells have been proposed in the past, that tend to prevent the leakage of the liquid from the cells during and after the discharge, but these constructions have not really solved the problem to date. These included the proposal of a plastic envelope to enclose the cell.

The use of a tightly surrounding plastic envelope has, however, in the past not succeeded, as the metallic terminals that make contact with the poles of the cell, and include head and bottom terminals, could not be guided sufficiently tightly through the envelope of synthetic plastic material; because where a metallic terminal is embedded, for instance by spraying, in a thermoplastic synthetic material, the synthetic material shrinks upon solidification, and thereby causes the synthetic material to be lifted off the embedded metallic object and to be moved in the direction of maximum concentration of the mass of the synthetic material. This, in turn, causes the occurrence of a small leak space between the synthetic material and the metal, that leads to leakage.

A further disadvantage of the known constructions of embedding of the metallic terminals in envelopes of synthetic material consists therein that on the interior of the envelope there remain relatively large metallic surface portions of the terminals uncovered, and hence subject to strong corrosion that destroys the sealing after a brief period of time.

So-called leakproof cells are known which provide for an envelope of absorptive material over which there is mounted under pressure an outer shell that usually is made of steel sheet; the outer steel sheet shell is connected to the cover and to the bottom of the cell by rolling in under pressure. These constructions, however, also have not provided a satisfactory solution, because also in these cells corrosion occurs on the two external terminals that are carried indirectly through the envelope, and these corrosions lead to loosening of the seal at the terminals.

The corrosion of the terminals can occur in two different ways. Firstly, the corrosion can occur by wetting of the contacts by the electrolyte solution leading to corrosion. This process, however, proceeds so slowly that it would by itself not prevent the building of practically leakproof galvanic cells.

Secondly, in galvanic cells of the prior art there occurs an electro-chemical corrosion. Due to the self-destruction of the usually cup-shaped negative electrode by the discharge, it cannot be avoided that the terminals are wetted by the electrolyte liquid and also come in contact with the positive depolarizer mass of the cell. Where a terminal is thus subject to contact not only by the electrolyte solution but also by the positive depolarizer mass, there is thus formed a separate local element with a positive pole constituted by the positive depolarizer mass, and the negative pole constituted by the electrolyte solution and the terminal itself; under the influence of the electromotoric force of this local element there occurs a rapidly progressing electro-chemical corrosion of the terminal that is embedded in the synthetic material, and hence there occurs a progressive leakage along the terminals of the otherwise closed envelope for the cell.

It is accordingly among the principal objects of the invention to provide a galvanic primary cell that is leakproof.

It is another object of the invention to provide such a galvanic cell that has a tightly surrounding plastic envelope for sealing.

It is a further object of the invention to avoid the aforesaid drawbacks of the prior art.

It is still another object of the invention to provide a galvanic cell or a stack of such cells with a completely surrounding plastic envelope, and to provide terminals, namely head terminals and bottom terminals, that pass through the envelope and are connected liquid-tightly with the envelope, and to arrange them in such a manner that they are substantially not subjected to any corrosion.

Further objects and advantages of the invention will be set forth in part in the following specification and in part will be obvious therefrom without being specifically referred to, the same being realized and attained as pointed out in the claims hereof.

Broadly speaking, the instant invention provides for a construction in which the terminal that is embedded in the bottom, as well as the terminal that is embedded in the cover, are composed of sheet metal that passes through the cover and the bottom, respectively, and are embedded in the synthetic plastic material of the cover and the bottom; the terminals throughout their region of embedding are provided with a row of closely adjoining apertures through which the synthetic plastic material extends like rivets; by this arrangement, each of the sheet metal terminals is embedded throughout a length which, measured from the exterior towards the interior of the cover and the bottom, respectively, is considerably larger than the thickness of the sheet metal in the embedding region.

The aforesaid apertures are being penetrated by the thermoplastic synthetic material of the envelope before the synthetic material has solidified, and during the solidification of the synthetic material these penetrating portions shrink and form thereafter rivets of synthetic material of diminishing length. Owing to this shrinking, the synthetic material is pressed closely against the metal along the contact surfaces thereof, so that the necessary sealing is accomplished. Due to the great length of embedding of the metal terminals, as measured from the exterior towards the interior of the cover as well as the bottom made of synthetic material, the surface portions of the synthetic material in contact with the metal in the embedding region are relatively large, so that during the solidification, the shrinking rivets of synthetic material press relatively large sealing surfaces strongly towards each other, resulting in a particularly good sealing. It has been found that in this manner a sealing may be achieved that withstands overpressures of one atmosphere above the regular atmosphere, and more.

The aforesaid second type of cause of corrosion, namely the electro-chemical corrosion, is largely prevented from occuring in accordance with the instant invention by the fact that the length of embedding of each metal part, as measured from the exterior towards the interior of the cover as well as the bottom, is considerably larger than the thickness of the metal of the terminals in the region of the embedding. By this arrangement, on one hand, there is prevented to a large extent the access of positive depolarizer mass to the terminals, and on the other hand, the creep distance, namely the distance which the progressing corrosion would need to pass from the interior of the terminal embedded in the plastic envelope to the exterior of said envelope, in order to lead to a leaking of the envelope, is narrow and long. By this narrow and long arrangement of the creep distance it is achieved that as little as feasible of depolarizer material may penetrate to the embedded portion of the metal terminal and any amount that did penetrate towards the metal, would be exhausted of depolarizer mass before it could cause corrosion throughout the entire length of the aforesaid creep distance.

It should be mentioned that it is not possible to use for galvanic primary cells of the instant type an envelope that is both liquid-tight as well as gas-tight, because during the discharge operation there develops gas. This gas development, if the envelope were completely gas-tight, would lead to the occurrence of high inner pressures, of several atmospheres, and hence to the bulging and finally bursting of the envelope of synthetic material. It is possible, however, by choosing correspondingly thinner envelopes composed of a suitable microporous synthetic material, to provide that the envelope, on one hand, is to a certain extent gas permeable and, on the other hand, is liquid-tight. Preferably, the cylindrical portion of the envelope for the galvanic primary cell is formed of a gas permeable, though liquid-tight relatively soft tubing made of synthetic material, for instance high pressure polyethylene, while the cover and bottom portions of the envelope into which there are embedded the terminals, is in the form of discs of solid completely fluid-tight synthetic material, for instance composed of low pressure polyethylene. The connection between the cover and bottom portions with the cylindrical portion may be achieved by welding or by spraying or the like, so that the entire envelope finally is composed of a single one-piece unit.

In a galvanic primary cell which is enclosed in an envelope of the type described, there will occur during discharge, depending on the type of discharge, internal pressures which normally will have a value of from about .1 to about .5 atmosphere above atmospheric pressure, and in extreme cases, such as upon complete discharge, temporarily may rise to from about .8 to about 1.0 atmosphere above atmospheric pressure. The sealing, in accordance with the instant invention, can withstand such internal pressures without any trouble.

Experiments have shown that primary cells made in accordance with the instant invention do not leak even if after they have completely been exhausted they are left, for instance due to negligence, in a battery fed apparatus. The construction of the instant invention, due to the aforedescribed sealing and prevention or at least restraint of the electro-chemical corrosion, avoids leaking, so that damages to the apparatus due to the exit of electrolyte is avoided.

The foregoing and other objects of the invention will be best understood from the following description of exemplifications thereof, reference being had to the accompanying drawings, wherein:

FIG. 1 is a sectional view of a galvanic primary element in accordance with the invention;

FIG. 2 is a fragmentary large scale sectional view of a portion shown in FIG. 1;

FIG. 3 is a fragmentary plan view of a part shown in FIG. 2;

Figure 4:
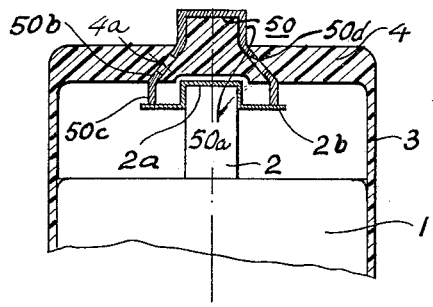
FIG. 4 is a fragmentary sectional view, similar to the upper portion of FIG. 1, but embodying a modification.

In carrying the invention into effect in the embodiments which have been selected for illustration in the accompanying drawings and for description in this specification, and referring now particularly to FIGS. 1–3, there is provided a galvanic primary cell that includes a negative cup-shaped electrode 1 that surrounds and from which there protrudes upwardly a positive electrode 2, for instance of the carbon pin type. The entire primary cell is tightly surrounded by an envelope 3 that is composed entirely of thermoplastic synthetic material. The cover portion 4 of the envelope 3 and the bottom portion 7 thereof, each have disc-shape and along their border are welded or otherwise fused with the cylindrical portion of the envelope 3, to form a single one-piece unit.

A head terminal 5 is provided that is composed of a sheet metal cap, the wall 5a of which is throughout a large region embedded in the thermoplastic synthetic material of the cover 4 of the envelope 3. The cylindrical portion of the envelope 3 is made of gas permeable, though liquid-tight, soft synthetic material, such as high pressure polyethylene; and the cover portion 4 and the bottom portion 7 are made of a gas-tight and liquid-tight solid synthetic material, such as low pressure polyethylene.

The wall 5a of the head terminal 5, as best shown in FIGS. 2 and 3, is provided with a row of very closely arranged apertures 5b which, during the spraying of the cover 4 with thermoplastic synthetic material are penetrated by portions 4a of the synthetic material in a rivet-like manner. During the solidification of the synthetic material, the rivet-like portions 4a will shrink, and thereby the portions of the synthetic material that lie on the opposite surfaces of the wall 5a of the terminal 5 will be pulled closely and tightly against the said wall 5a. The lower rim 5c of the terminal 5 will protrude slightly beyond the inner face of the cover 4, and is flanged outwardly, so that it provides a good seat for the upper portion of the positive carbon electrode 2. The interior of the terminal 5 may be filled either completely with synthetic material, or as shown in FIGS. 1 and 2, may be left with a partial cavity. It is important, however, that the entire interior surface of the terminal 5 is covered with the synthetic material. As best shown in FIG. 2, the depth $t$ of the cover 4, and therefore the depth of embedding of the terminal 5 within the cover 4 is considerably larger than the thickness $d$ of the wall 5a of the terminal 5.

Instead of making the apertures 5b round, they may be made rectangular or of other shape. The terminal 5 may have a cap form other than the illustrated cylindrical shape.

As best shown in FIG. 4, the positive carbon electrode 2 may, in accordance with a modification, be provided with a metal cap 2a that has a broad resilient flange 2b. The terminal 50 for the electrode 2 includes a cylindrical upper portion 50a of a relatively smaller diameter, a conical middle portion 50b that flares outwardly from the exterior of the primary cell towards the interior thereof, and a cylindrical lower portion 50c of relatively large diameter. The conical middle portion 50b is provided with a row of closely adjacent apertures 50d throughout its entire circumference, and these apertures 50d are penetrated by the thermoplastic synthetic material of the cover 4 in the form of plastic rivets 4a. The region of embedding includes the middle portion 50b and, where desired, the adjoining zones of the upper portion 5a and the lower portion 5c of the metal cap 50. The free rim of the lower portion 50c rests on the flange 2b of the metal cap 2a, making electric contact therewith.

The advantage of this modification resides therein that the length of embedding of the terminal 50 measured from the exterior towards the interior of the cover 4 is enlarged as compared to the embodiment of FIG. 1.

The bottom of the envelope 3 is formed by a disc 6 that is united with the cylindrical portion of the envelope 3 either by welding or other fusing, or by thermoplastic spraying. At the exterior of the bottom 6 there is embedded a bottom terminal 7 that has a bent-up sidewall 7a that serves as a galvanic connection between the terminal 7 and the bottom portion of the cup-shaped negative electrode 1. The aforesaid connection is embedded closely on all sides in the bottom 6, and its rim 7b that projects above the bottom 6 serves as a contact maker for the negative cup-shaped electrode 1.

The portion 7a is provided with apertures 7c which, as shown in FIG. 1, during the embedding in the bottom 6 are penetrated by the thermoplastic synthetic material thereof, thereby ensuring, as explained in the foregoing a tight embedding of the bottom terminal 7 in the synthetic material of the bottom 6.

Figure 5:
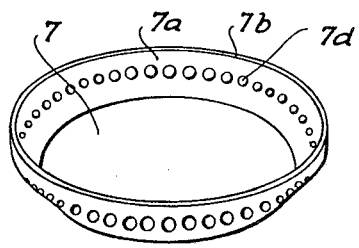
FIG. 5 is a perspective view of an embodiment of a bottom metal terminal.
Figure 6:
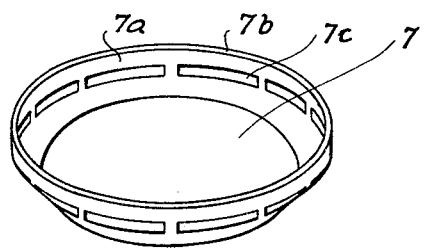
FIG. 6 is a perspective view, similar to FIG. 5, but embodying a modification.

Also here the length of embedding is considerably greater than the thickness of the metal of the terminal 7. In order to achieve a large length of embedding even at a medium thickness of the bottom 6, the sidewalls 7a, as shown in FIGS. 5 and 6, preferably is tapered upwardly so as to flare outwardly in the direction from the exterior towards the interior of the primary cell. The apertures within this sidewall 7a may be round holes, as shown in FIG. 5, or elongated apertures, as shown in FIG. 6, or may have other shapes.

Figure 7:
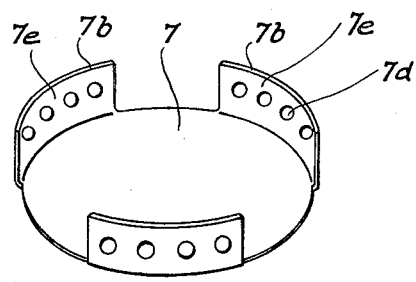
FIG. 7 is a perspective view, similar to FIG. 5, but embodying a further modification.

In the modification shown in FIG. 7, the sidewall is formed of three sectors 7e that are spaced from each other uniformly along the border of the main portion of the terminal 7.

In all the embodiments, the free upper edge 7b of the sidewall 7a, or 7e, respectively, forms the contact engaging portion for the bottom surface of the negative cup-shaped electrode 1.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A galvanic primary element having a first electrode of one polarity and a second electrode of opposite polarity, an electrolyte, an envelope composed of synthetic material surrounding said element to restrain the leaking of said electrolyte and including a bottom and a top section, and terminals for said electrodes embedded in said material, wherein the improvement comprises, said terminals being formed of sheet metal passing through said synthetic material envelope at said bottom and top sections, respectively, and making contact with the respective electrode and defining each throughout the region of embedding a series of closely adjacent apertures penetrated in rivet-like manner by said material, the length of embedding measured from the exterior towards the respective electrode being substantially greater than the thickness of the sheet metal in said region of embedding, one of the electrodes being a head electrode, the terminal for said head electrode being in the form of a cap, the apertures of said cap being defined within a zone along a closed encircling row, said terminal having a middle portion in which said apertures are defined, said middle portion including a conical widening between an outer cylindrical portion of smaller diameter and an inner cylindrical portion of larger diameter.

2. A galvanic primary element, as claimed in claim 1, said inner cylindrical portion having a free inner rim, said head electrode comprising a metallic portion including a flange, said free rim of said terminal being in electric contact engagement with said flange.

3. A galvanic primary element having a first electrode of one polarity and a second electrode of opposite polarity, an electrolyte, an envelope composed of synthetic material surrounding said element to restrain the leaking of said electrolyte and including a bottom and a top section, and terminals for said electrodes embedded in said material, wherein the improvement comprises, said terminals being formed of sheet metal passing through said synthetic material envelope at said bottom and top sections, respectively, and making contact with the respective electrode and defining each throughout the region of embedding a series of closely adjacent apertures penetrated in rivet-like manner by said material, the length of embedding measured from the exterior towards the respective electrode being substantially greater than the thickness of the sheet metal in said region of embedding, one of said electrodes having a bottom surface, one of said terminals being a bottom terminal embedded throughout a portion in said bottom section of said envelope and including an upwardly bent sidewall having a free rim, said apertures being defined in said sidewall, said rim making contact with the bottom surface of said one electrode.

4. A galvanic primary element, as claimed in claim 3, said bottom terminal being round, said sidewall including a diverging portion embedded in said bottom section of said envelope.

5. A galvanic primary element, as claimed in claim 3, said bottom terminal including a plurality of sidewall sectors embedded in said bottom section of said envelope, said apertures being defined in each sector.

References Cited

UNITED STATES PATENTS

| 2,419,589 | 4/1947 | Paul | 136—133 |
| 2,710,307 | 6/1955 | Szundy | 136—135 XR |
| 1,481,145 | 1/1924 | Pepper | 136—166 XR |

FOREIGN PATENTS

| 1,445,913 | 6/1966 | France. |

ALLEN B. CURTIS, Primary Examiner

D. L. WALTON, Assistant Examiner

U.S. Cl. X.R.

136—135